US007742574B2

(12) United States Patent
Karlsson

(10) Patent No.: US 7,742,574 B2
(45) Date of Patent: Jun. 22, 2010

(54) APPROACH AND DEVICE FOR FOCUSING X-RAYS

(75) Inventor: Staffan Karlsson, Kista (SE)

(73) Assignee: Mats Danielsson, Taby (SE)

( * ) Notice: Subject to any disclaimer, the term of this patent is extended or adjusted under 35 U.S.C. 154(b) by 0 days.

(21) Appl. No.: 12/081,235

(22) Filed: Apr. 11, 2008

(65) Prior Publication Data

US 2009/0257563 A1 Oct. 15, 2009

(51) Int. Cl.
*G21K 1/06* (2006.01)
*G01T 1/30* (2006.01)

(52) U.S. Cl. ...................................... 378/145; 250/368

(58) Field of Classification Search ................. 378/145; 250/368; 359/362, 364–366, 379, 431, 558, 359/572–575, 642, 668–671, 720, 724, 726–736, 359/796, 797, 809, 831, 833, 834, 837, 896
See application file for complete search history.

(56) References Cited

U.S. PATENT DOCUMENTS

| | | | | |
|---|---|---|---|---|
| 3,254,556 | A * | 6/1966 | Staunton | 359/615 |
| 4,146,306 | A * | 3/1979 | Wallach | 359/738 |
| 4,315,671 | A * | 2/1982 | Bunch | 359/741 |
| 4,934,798 | A * | 6/1990 | Bunch | 359/19 |
| 5,703,722 | A * | 12/1997 | Blankenbecler | 359/653 |
| 5,837,082 | A * | 11/1998 | Grafe | 156/154 |
| 6,091,798 | A * | 7/2000 | Nygren et al. | 378/84 |
| 6,269,145 | B1 | 7/2001 | Piestrup et al. | |
| 6,444,994 | B1 | 9/2002 | Ohmori et al. | |
| 6,668,040 | B2 | 12/2003 | Cederstrom | |
| 6,949,748 | B2 | 9/2005 | Ziock et al. | |
| 2002/0148956 | A1 | 10/2002 | Piestrup et al. | |
| 2002/0159561 | A1 * | 10/2002 | Cederstrom | 378/84 |
| 2003/0081724 | A1 | 5/2003 | Piestrup | |
| 2006/0251215 | A1 | 11/2006 | Cernik | |
| 2006/0256919 | A1 * | 11/2006 | Cederstrom | 378/84 |
| 2007/0121784 | A1 * | 5/2007 | Cederstrom et al. | 378/62 |

OTHER PUBLICATIONS

International Search Report mailed Jul. 22, 2009 in corresponding European Application No. 09156639.Aug. 2208.

Cederström, et al., Generalized prism-array lenses for hard X-rays, J. Synchrotron Rad., vol. 12, No. 3, May 2005, pp. 340-344, XP-002537854.

(Continued)

*Primary Examiner*—Edward J Glick
*Assistant Examiner*—Anastasia Midkiff
(74) *Attorney, Agent, or Firm*—Nixon & Vanderhye P.C.

(57) ABSTRACT

A new device for x-ray optics is proposed which is an analogous to zone plates but works for higher x-ray energies. This is achieved by using both refraction and diffraction of the x-rays and building the new device(s) in a three dimensional structure, contrary to the zone plates which are basically a two dimensional device. The three dimensional structure is built from a multitude of prisms, utilizing both refraction and diffraction of incoming x-rays to shape the overall x-ray flux. True two dimensional focusing is achieved in the x-ray energy range usually employed in medical imaging and may be used in a wide area of applications in this field and in other fields of x-ray imaging. The device can be readily produced in large volumes.

25 Claims, 15 Drawing Sheets

OTHER PUBLICATIONS

Jark et al., *Focusing X-rays with simple arrays of prism-like structures*, J. Synchrotron Rad., vol. 11, 2004, pp. 248-253, XP002537855.
Fredenberg et al., *Prism-array lenses for energy filtering in medical X-ray imaging*, vol. 6510, 2007, pp. 65100S-2 -65100S-12, XP040237087.
Ribbing et al., *Microfabrication of saw-tooth refractive X-ray lenses in low-Z materials*, Journal of Micromechanics & Microengineering, vol. 13, No. 5, Sep. 1, 2003, pp. 714-720, XP020068983.
Stein et al., Fabrication of silicon kinoform lenses for hard X-ray focusing by electron beam lithography and deep reactive ion etching, Journal of Vacuum Science and Technology: Part B, vol. 26, No. 1, Jan. 4, 2008, pp. 122-127, XP012114059.
Danielsson U.S. Appl. No. 11/984,541 filed on Nov. 17, 2007.
Office Action mailed Oct. 7, 2008 in U.S. Appl. No. 11/984,541.
Office Action mailed Mar. 19, 2009 in U.S. Appl. No. 11/984,541.
Office Action mailed Sep. 3, 2009 in U.S. Appl. No. 11/984,541.
Campbell, The Science and Engineering of Microelectronic Fabrication, 2$^{nd}$ Edition, New York, Oxford University Press, 2001, Table of Contents.
Budinger et al., Imaging Transgenic Animals, Annu. Rev. Biomed. Eng., 1999, 01:611-648.
Lengeler, A microscope for hard x rays based on parabolic compound refractive lenses, Applied Physics Letters, vol. 74, No. 26, Jun. 28, 1999, pp. 3924-3926.
Solomon et al., Applications of Positron Emission Tomography in the development of Molecular Targeted Cancer Therapeutics, Biodrugs 2003: 17(5):339-354.
Attwood, Soft X-Rays and Extreme Ultraviolet Radiation, Principles and Applications, Cambridge University Press, Table of Contents.
Bushberg et al., The Essential Physics of Medical Imaging, Second Edition, Lippincott Williams & Wilkins, Table of Contents.
Batignani et al., Double-sided silicon strip detectors in Pisa, Nuclear Instruments and Methods in Physics Research A 360 (1995) pp. 98-102.
Gambhir et al., Imaging adenoviral-directed reporter gene expression in living animals with positron emission tomography, Proc. Natl. Acad. Sci. USA, vol. 96, pp. Mar. 1999, pp. 2333-2338.
Meikle et al., CoALA-Spect: A Coded Aperture Laboratory Animal SPECT System for Pre Clinical Imaging, IEEE, 2003, pp. 1061-1065.
Kastis, Compact CT/SPECT Small-Animal Imaging System, IEEE, 2003, pp. 797-801.
Chmeissani et al., First Experimental Tests With a CdTe Photon Counting pixel Detector Hybridized With a Medipix2 Readout Chip, IEEE Transactions on Nuclear Science, vol. 51, No. 5, Oct. 2004, pp. 2379-2385.
King et al., Introduction to the Physics of Molecular Imaging With Radioactive Tracers in Small Animals, Journal of Cellular Biochemistry Supplement 39:221-230 (2002).
Skula et al., Position emission tomography: An overview, Journal of Medical Physics, vol. 31, No. 1, 2006, pp. 1-9.
Fowler et al., PET and Drug Research and Development, The Journal of Nuclear Medicine, vol. 40, No. 7, Jul. 1999, pp. 1154-1163.
Beckman, U-SPECT-I: A Novel System for Submillimeter-Resolution Tomography with Radiolabeled Molecules in Mice, The Journal of Nuclear Medicine, vol. 46, No. 7, Jul. 2005, pp. 1194-1200.
Moses, Trends in PET imaging, Nuclear Instruments and Methods in Physical Research A 471 (2001) 209-214.

* cited by examiner

APPROACH AND DEVICE FOR FOCUSING X-RAYS

TECHNICAL BACKGROUND

In all imaging systems utilizing visible light, optics is an important tool to increase the performance for the imaging task. The optics can for example enable higher spatial resolution through magnification and also higher fluxes by collecting the light rays.

In X-ray imaging this is not true, in e.g., medical x-ray imaging, there are no x-ray optics in regular clinical use. The explanation is that for energies exceeding around 15 keV, the difference in refraction index in any material compared to vacuum is very small, several orders of magnitude smaller than for visible light. This means that any optics are very hard to construct. At lower X-ray energies, so called zone plates are successfully used in many applications, while at higher energies they become increasingly inefficient and difficult to manufacture. In spite of these challenges, some X-ray optics have been tested to also work at higher energies. One example is grazing incidence optics as described in U.S. Pat. No. 6,949,748 where the x-rays hit a curved surface at a very small angle. Other examples are refractive optics as outlined in U.S. Pat. Nos. 6,668,040 and 6,091,798 and also the so-called phase array lens as described in B. Cederström, C. Ribbing and M. Lundqvist, "Generalized prism-array lenses for hard X-rays", J. Sync. Rad, vol 12(3), pp. 340-344, 2005.

A summary of state of the art x-ray optics can be found in "Soft X-Rays and Extreme Ultraviolet Radiation—Principles and Applications", David Attwood ISBN-13: 9780521029971, Cambridge University Press 2007. The optics for higher energies are generally one dimensional which sometimes fits the application, such as imaging using scanning line detectors, but in most cases optics that work in two dimensions is desirable. This can be achieved by crossing two one dimensional lenses, putting one after the other. This however results in a bulky device with compromised performance since absorption is increased and the two dimensional performance becomes sub-optimum by using one dimensional devices. This may be why these arrangements are not in wide practical use, or in fact, are hardly used at all for any application.

SUMMARY

The technology describe herein overcomes these and other drawbacks.

In the technology describe herein, we propose technology similar to the zone plates but working for higher x-ray energies, normally exceeding 10 keV. This is achieved by using both refraction and diffraction and building the new device(s) in a three dimensional structure, contrary to the zone plates which are basically a two dimensional device. The three dimensional structure is built from a multitude of prisms, utilizing both refraction and diffraction of incoming x-rays to shape the overall x-ray flux. The result will be the first ever device achieving true two dimensional focusing in the x-ray energy range usually employed in medical imaging and may be used in a wide area of applications in this field and in other fields of x-ray imaging. The device will further be fairly straight forward to produce in large volumes.

In another aspect, there is provided a method of manufacturing such x-ray optics devices.

The technology describe herein also relates to an x-ray imaging system based on the novel x-ray optics device.

DETAILED DESCRIPTION

In the following, the technology describe herein will be described with reference to exemplary and non-limiting embodiments of a new x-ray optics device based on a three dimensional prism structure or arrangement utilizing both refraction and diffraction for shaping the incoming x-ray flux.

In particular, the invention offers a solution to the challenges in state-of-the-art x-ray optics by offering means for efficient two dimensional focusing of x-rays with energy above around 10 keV with a device that is easy to align, handle and produce.

Figure 1A:
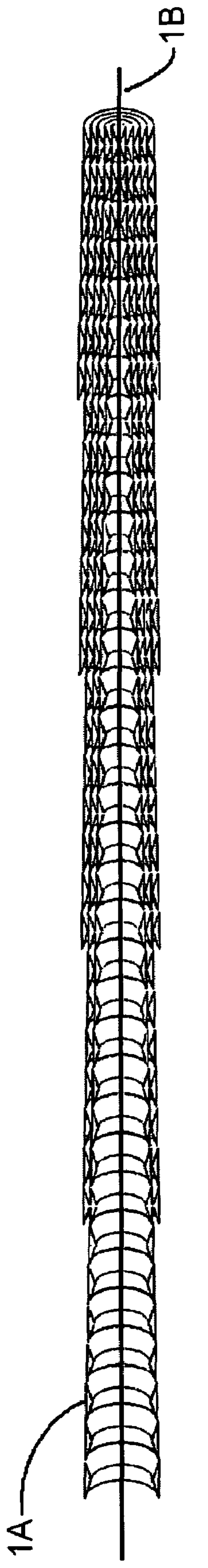
FIGS. 1A-C are schematic diagrams illustrating examples of a new x-ray focusing device together with a cross-section of the device including the multitude of prisms and how they may be arranged relative to each other.
Figure 1B:
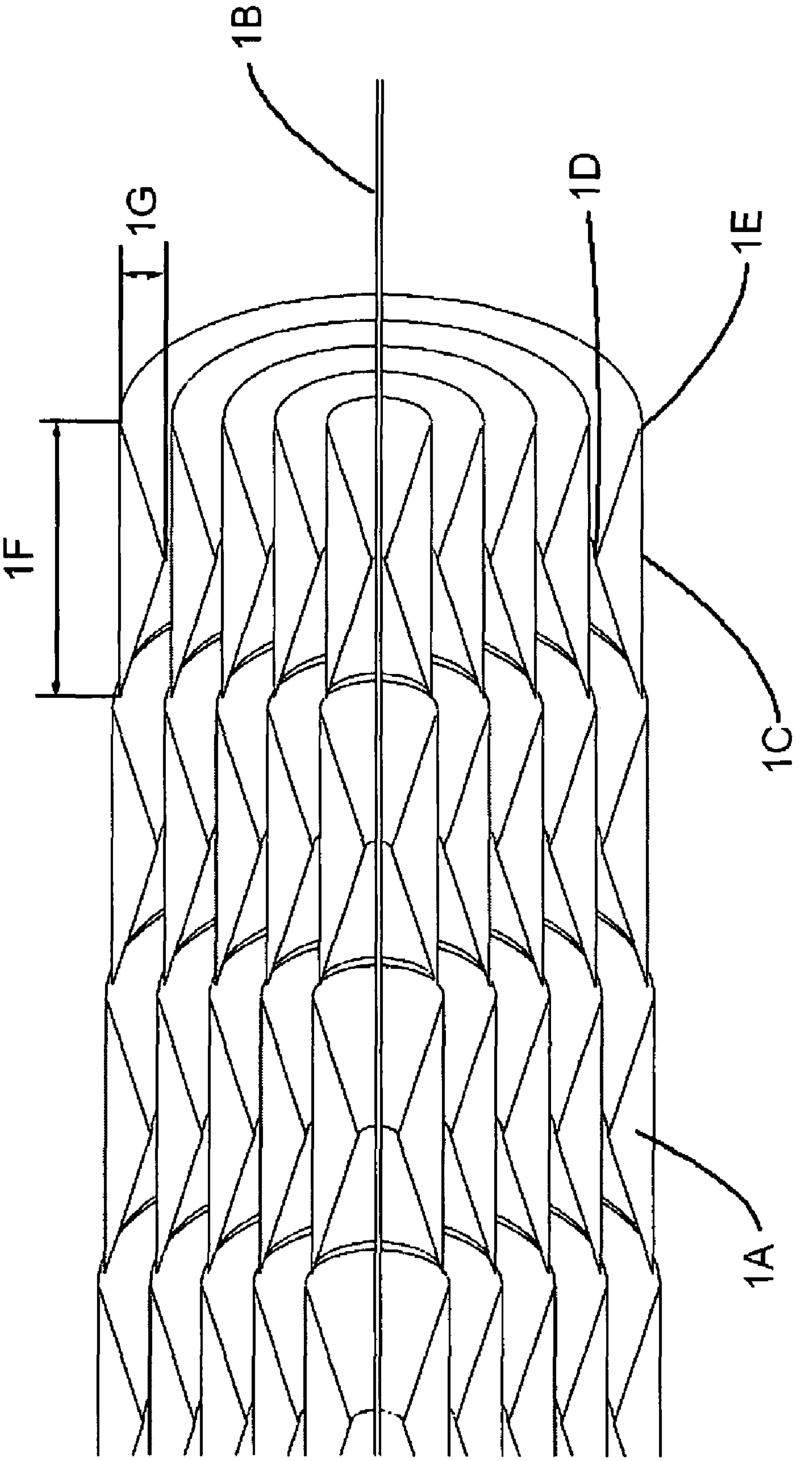

FIG. 1A illustrates an example of a device including a multitude of prisms which are traversed by incoming x-rays. The prisms (1A) are preferably arranged in one or more layers along an axis of symmetry, the so called optical axis (1B), and for x-rays entering substantially parallel to the optical axis there will be a focusing effect. The device will also work for x-rays entering the lens which are not entirely parallel to the optical axis, in this case with a slight reduction in the efficiency. As shown in FIG. 1B, the orientation of the "lens" is preferably such that the flat back of the prisms (1C) is oriented to be substantially parallel to the optical axis, the obtuse corner (1D) is pointing in substantially right angle to the optical axis while the sharp angles (1E) is pointing substantially along the optical axis 1A. The number of prisms in cross-section (i.e. orthogonal to the optical axis) changes when moving along the optical axis and a corresponding void also changes in diameter. The reason is that x-rays further away from the optical axis requires more deflection than x-rays close to the optical axis. The prisms are arranged in such a way to achieve the desired focusing effects which is in turn decided by the amount of material and the number of surfaces traversed by any single x-ray. The three-dimensional prism structure is thus arranged such that x-rays further away from the optical axis will traverse more prisms than x-rays close to the optical axis. The optimum design of the device will depend on the x-ray energy and has to be decided through experiments and/or calculations in each case.

Typically, mechanical support structures are included to hold the individual prisms. It is beneficial to make the prisms and/or the support structures out of plastic or any other material which is mainly transparent to x-rays.

Figure 1C:
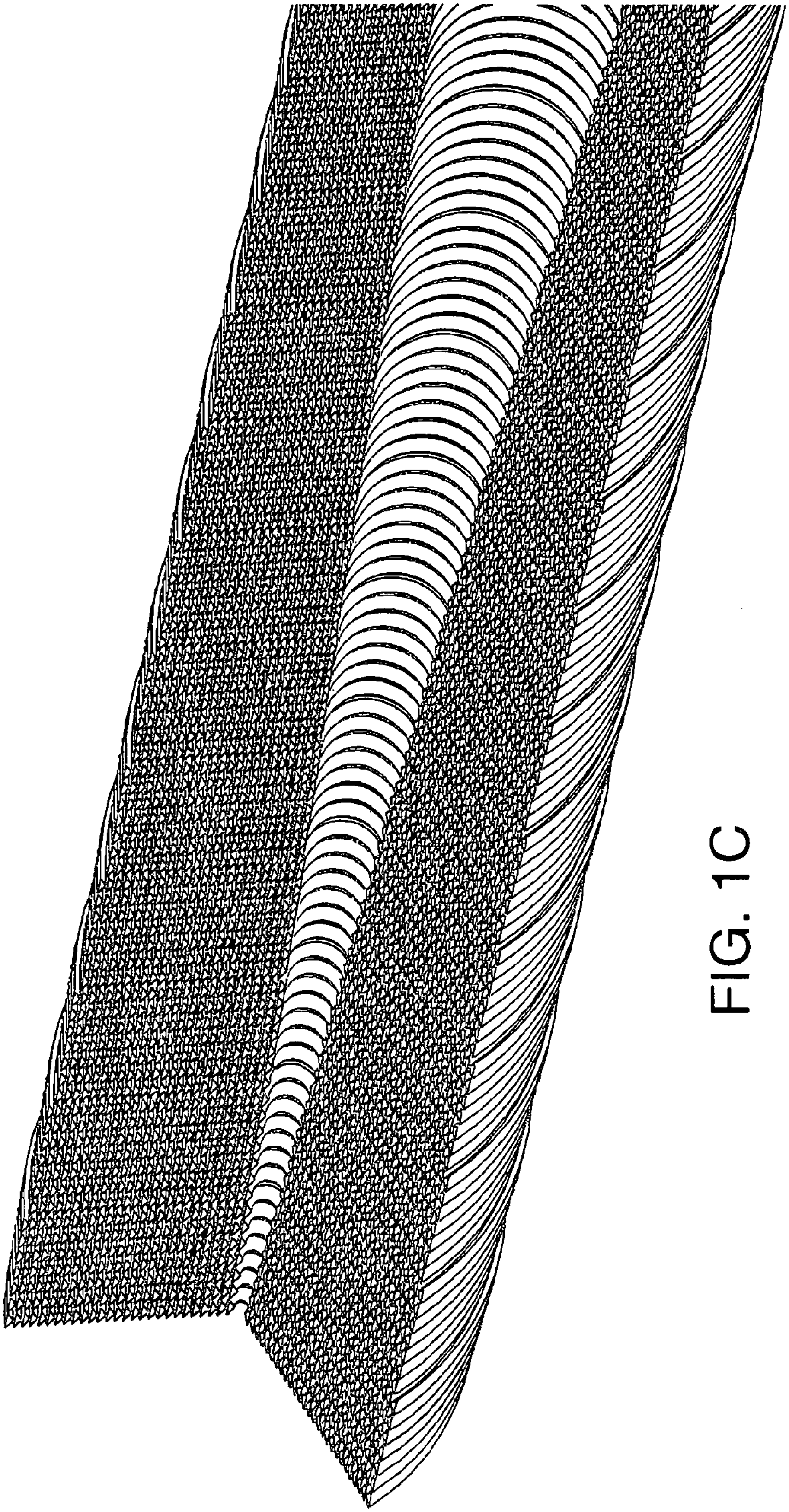

It should be understood that the number of prisms is normally relatively large, compared to the schematic diagrams of FIGS. 1A-B. An example of a more realistic configuration is shown in FIG. 1C, which illustrates part of an exemplary three-dimensional prism arrangement.

As an example, for an optimum effect at around 27 keV the length of each prism (1F) should be around 140 micrometers while the height (1G) should be around 7 micrometers. In a particular exemplary realization, the number of prisms orthogonally to the optical axis may be around 60 and the number of prisms along the optical axis may be around 230, yielding an outer diameter of the device of around 0.5 millimeters and a length of about 33 millimeters, including support structures. One may think that increasing the diameter of the device would yield an increase in the so called aperture and a corresponding increase in collecting incoming x-rays but this is not the case since the absorption will increase towards the edges and approaches one hundred percent. Increasing the diameter beyond what is indicated in the example above for 27 keV will for example be less useful.

In general x-ray absorption in the device decreases its efficiency and to minimize this effect a light element of low atomic number should be used, as for example a polymer made of Hydrogen, Oxygen and Carbon.

The prisms should be fabricated to high surface finish and form tolerance to work well.

Since ideal structures may be hard to manufacture, one or more of a number of practical approaches may be taken:

1) Divide the device in discs or slices along the optical axis.
2) Make these (ideally circular) discs not circular but hexagonal or other shapes. It should thus be understood that the discs are not necessarily circular, but may have other forms.
3) Sub-dividing the discs into sectors.
4) Divide the device in layers orthogonally to the optical axis.
5) Divide the individual prisms in two or more parts to be assembled later.
6) Introduce a radius for the edges of the prisms—they will not be infinitely sharp.
7) Introduce space between the individual prisms and rearrange them while keeping the projected amount of material and the number of prism surfaces traversed as seen by the incoming x-rays.
8) Add material to mechanically support the individual prisms.

Figure 2A:
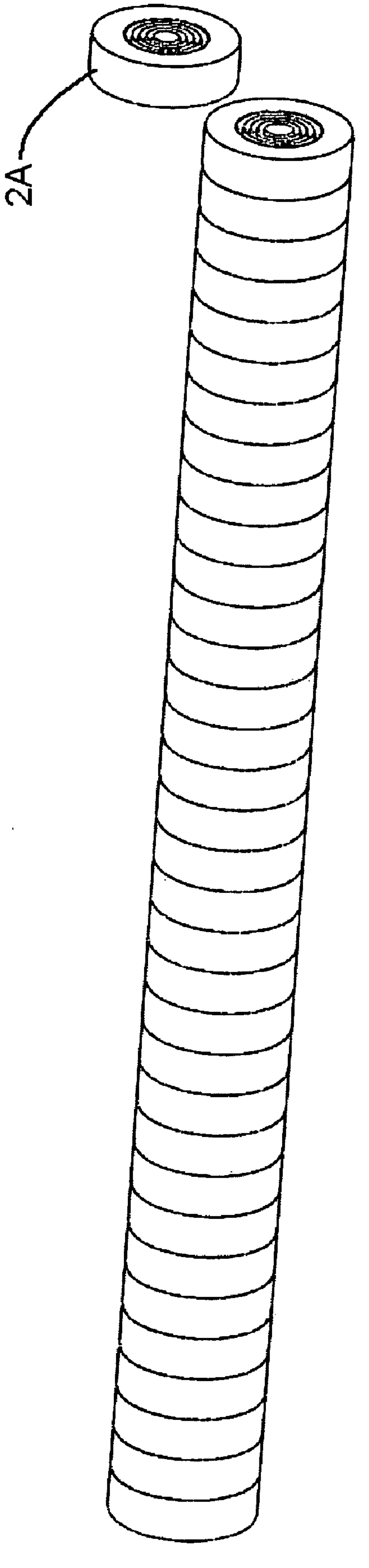
FIGS. 2A-D are schematic diagrams illustrating preferred embodiments of the design and manufacturing of a device assembled from a multitude of discs or plates and possible designs for the discs or plates are also outlined including the possibility to manufacture many devices in parallel.

In a preferred exemplary embodiment of the device, as mentioned above, it can be built from slices such as discs or plates arranged or assembled side by side along the optical axis according to FIG. 2A.

Figure 2B:
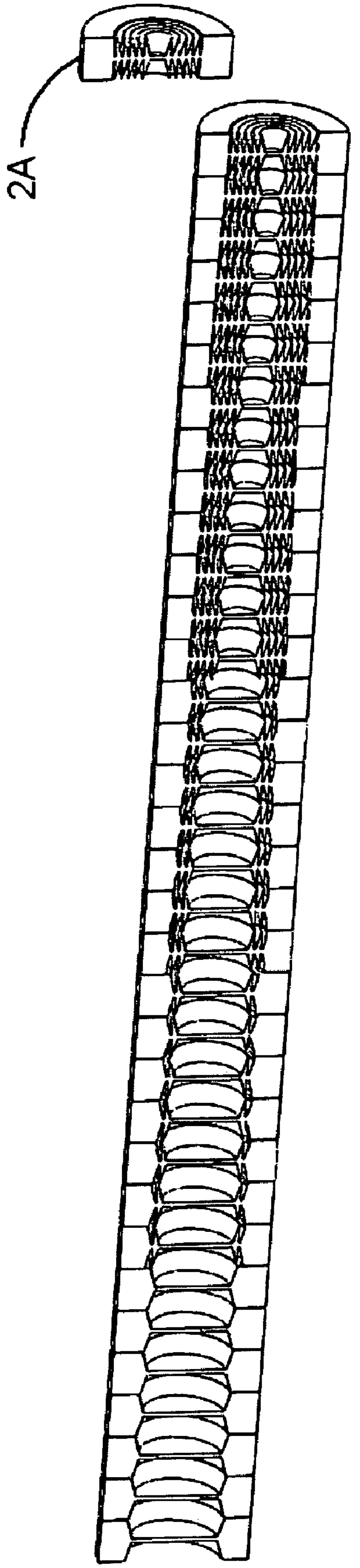

A corresponding cross-section view is illustrated in FIG. 2B. Each disc preferably has a rotationally symmetric or near-symmetric (e.g. hexagonal) form, and accordingly the overall prism arrangement also has a rotationally symmetric or near-symmetric (e.g. hexagonal) form. The discs arranged along the optical axis are preferably grouped, and the number of prisms (seen in a direction orthogonal to the optical axis) in a first group of discs generally differs from the number of prisms in a second group of discs. In this way, the number of prisms in cross section (i.e. orthogonal to the optical axis) will be different at different positions along the optical axis. In addition, the distance of a given layer of prisms in relation to the optical axis may differ between different discs within a group of discs, as can be seen from FIG. 2C.

It should though be understood that the groups, having the same number of prisms in a direction orthogonal to the optical axis, may be re-arranged in any arbitrary order along the optical axis.

In fact, the discs may optionally be arranged in any arbitrary order, without any concept of groups.

Each disc may have one or more layers of at least one prism. With many layers, each layer typically has one or more prisms. It is even possible to build discs that contain only a fraction of a prism. Preferably, however, an entire prism or several layers of one or more prisms is/are contained in a disc. Generally, each disc includes at least one layer of at least part of a prism.

Each disc or plate (2A) can be fabricated through standard techniques such as mechanical tooling, ablation for example with a laser, hot embossing, UV embossing or molding using a master or other methods. It has been recognized that a master for molding may be fabricated through etching in e.g. Silicon or through laser ablation.

Figure 2C:
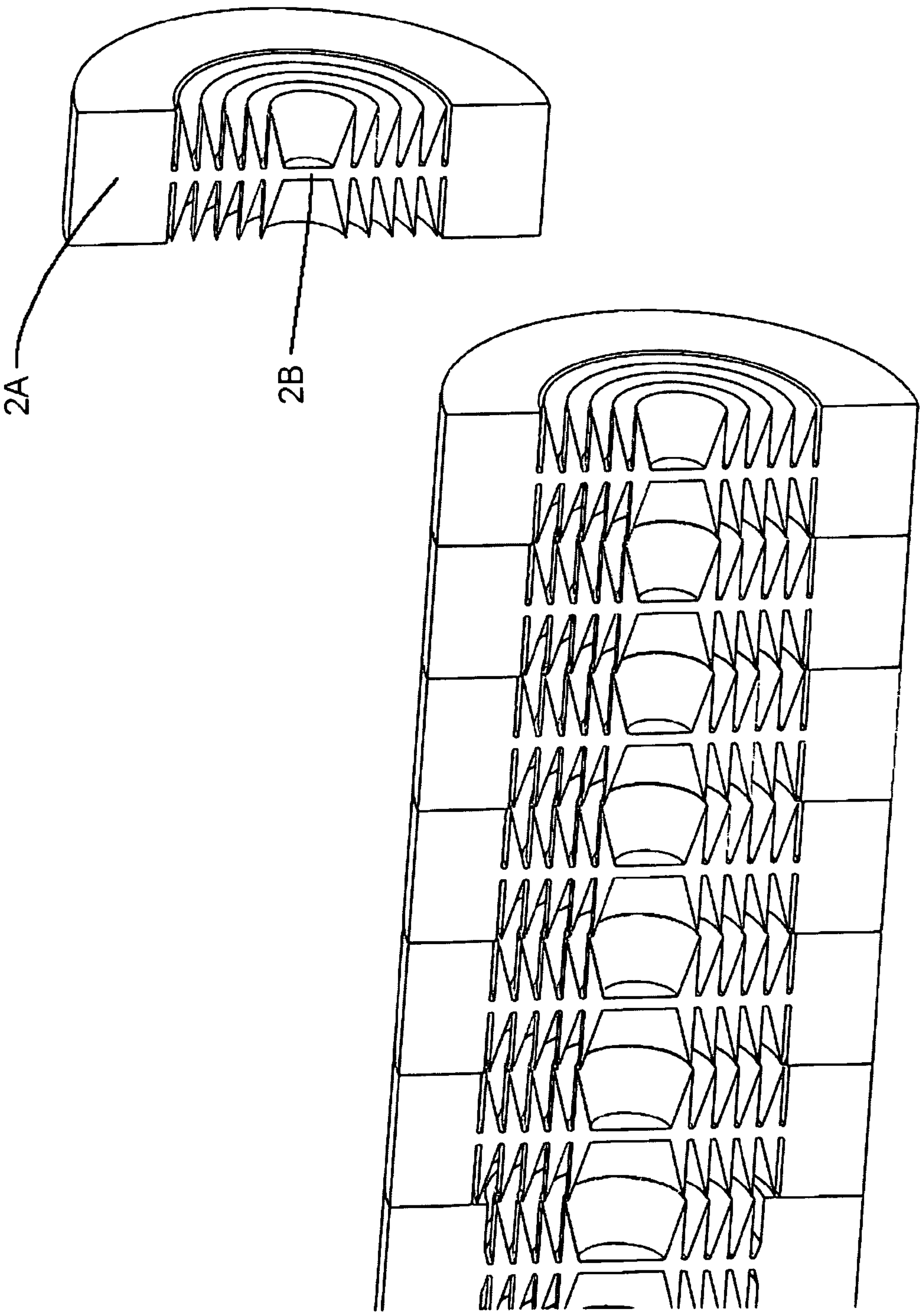
Figure 2D:
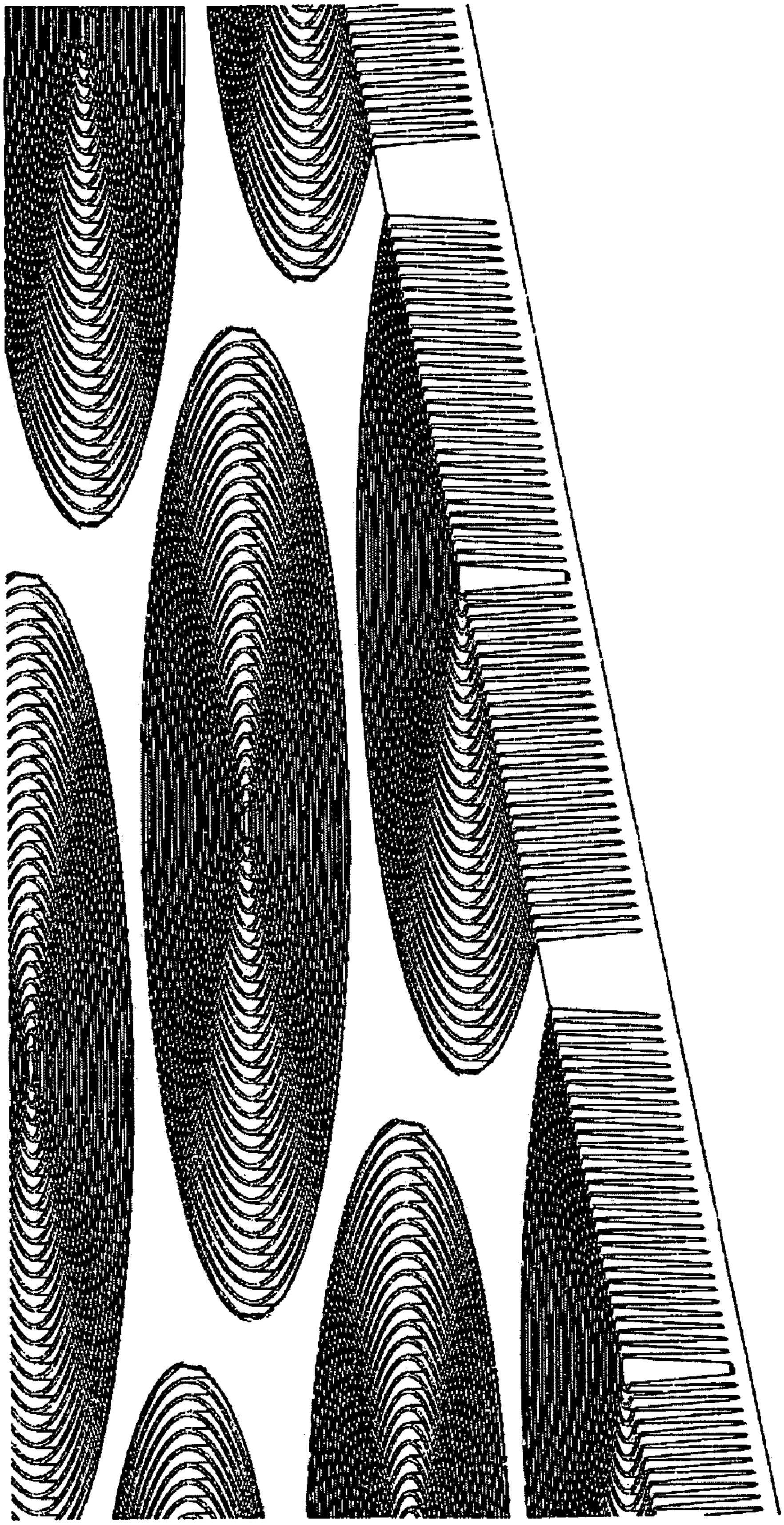

In the magnified cross-section view of FIG. 2C, a preferred example of a design for mechanical support (2A, 2B) of the prisms is illustrated. The advantage with this design is that all prisms in a layer are in one piece and not in two or more pieces, which will need alignment later. The different discs or plates can in the assembly process be aligned relative to each other either in an assembly machine or through built-in structures, so called passive alignment, or they may be aligned manually. A great advantage with this manufacturing process is that many individual "lenses" or x-ray optics devices can be fabricated in parallel as indicated in FIG. 2D. As illustrated in FIG. 2D, a number of independent discs are produced on a common substrate. It is possible to produce two or more x-ray optics devices in parallel by stacking a number of such substrates in proper alignment and mechanically attaching them and finally extracting individual three-dimensional prism structures. FIG. 2D also illustrates the principle of constructing the prisms in several (e.g. two) pieces that will subsequently be assembled in order to provide a full prism or one or more layers of full prisms.

Figure 3A:
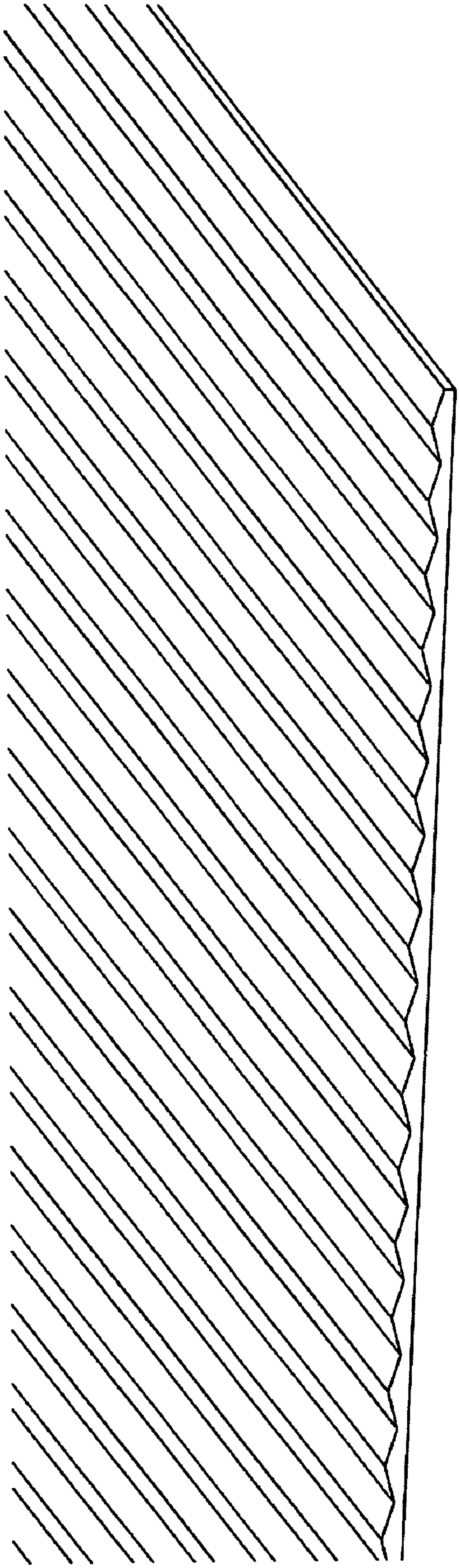
FIGS. 3A-F are schematic diagrams illustrating the design and manufacturing of an exemplary embodiment of the device where a thin foil with a prism structure can be rolled to achieve the desired three-dimensional structure.
Figure 3B:
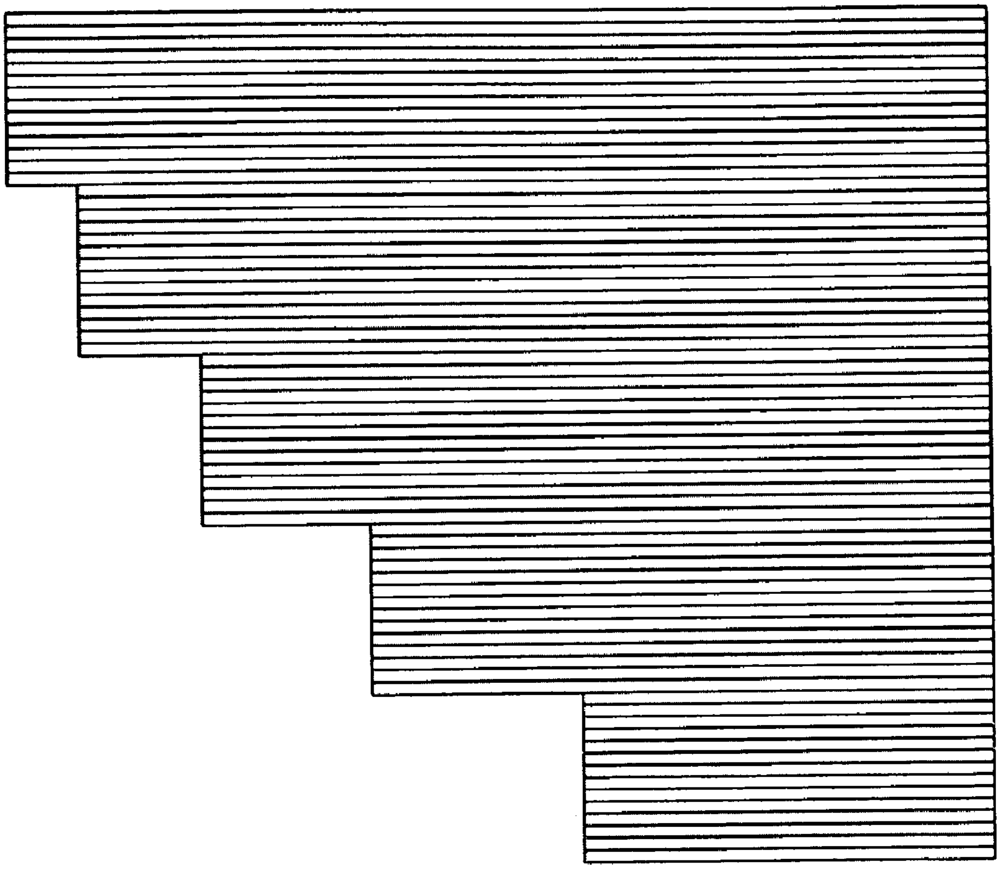
Figure 3C:
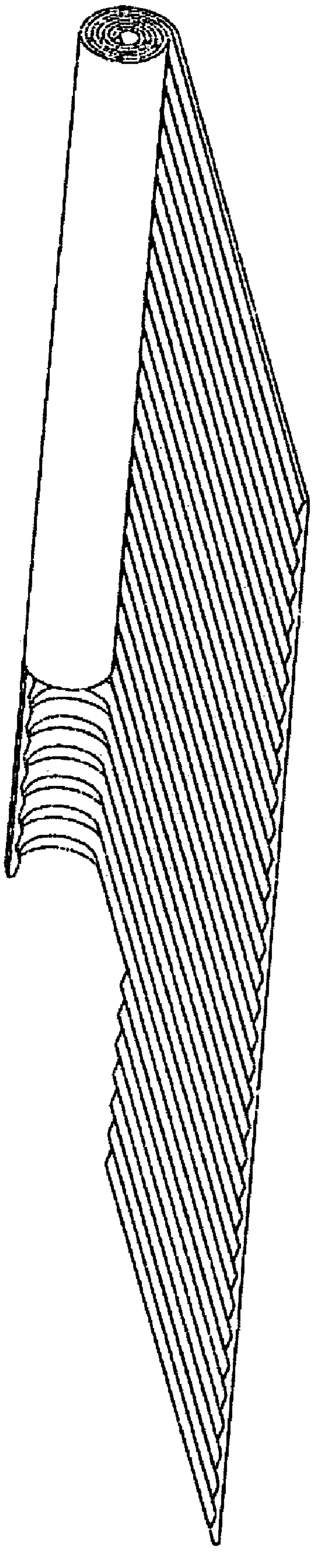
Figure 3D:
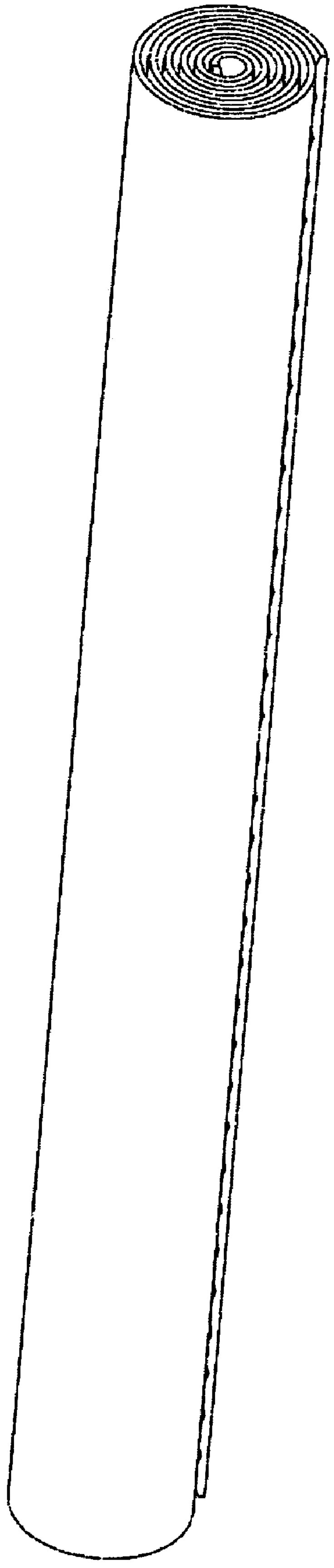
Figure 3E:
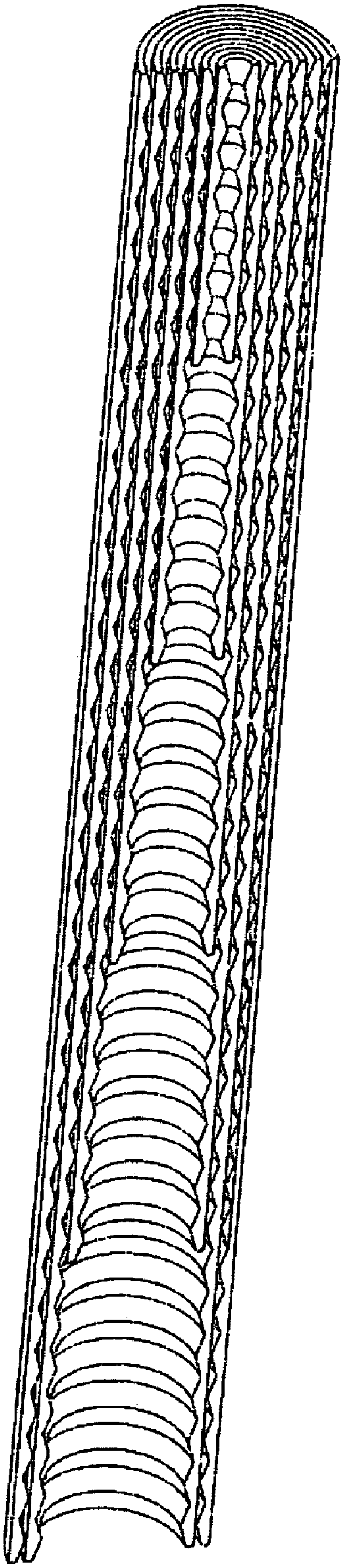
Figure 3F:
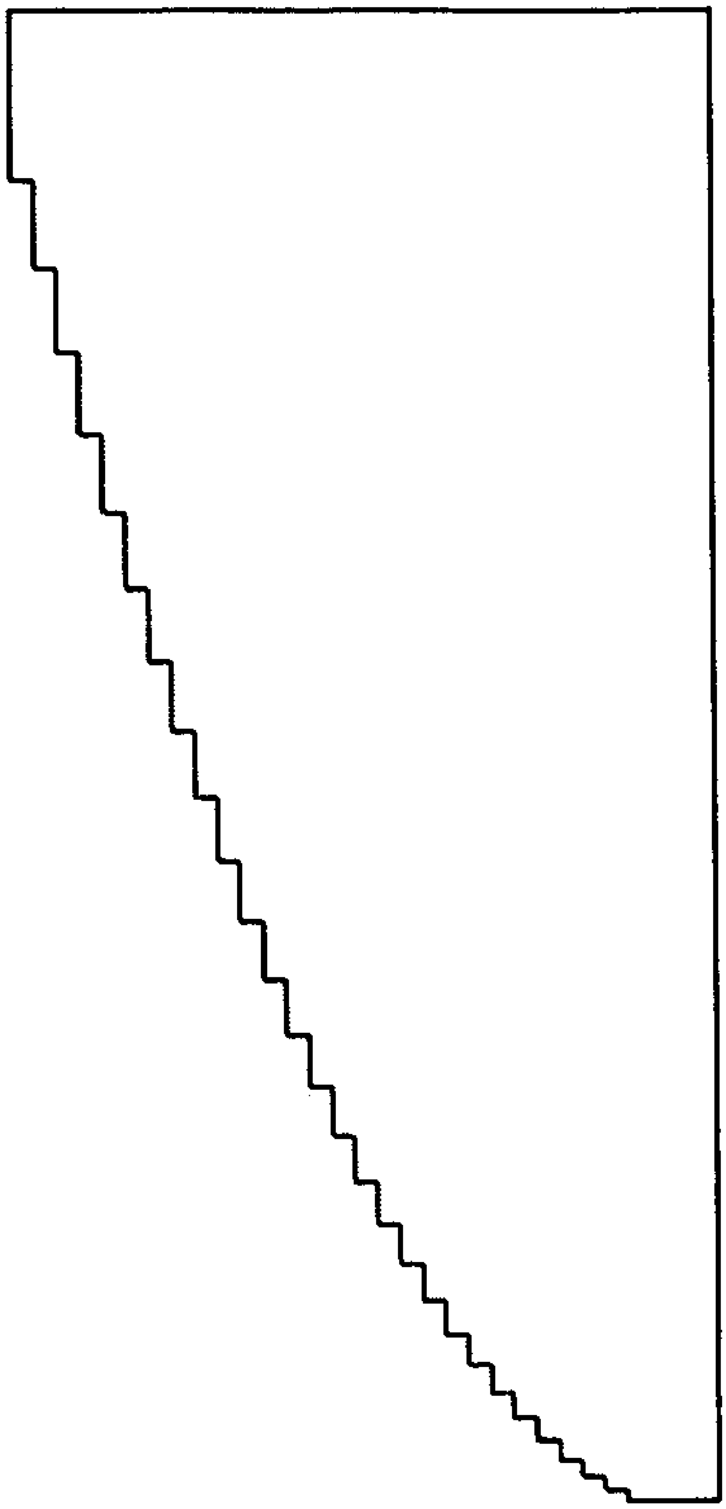

Another embodiment of the invention is based on preparing a thin foil with a layer of prisms as illustrated in FIG. 3A. The advantage with this method it that it is easy to manufacture a film or similar thin substrate with the desired structure since the height of the prisms above the film is relatively small. The prisms on the foil may for example be manufactured through hot embossing or UV embossing. For example, the prisms may be manufactured by embossing from a laser-abladed, etched or machined master, and then arranged on the foil. Alternatively, the prisms may be formed directly into the foil by any of the above-mentioned methods (e.g. laser ablation, etching, machining). Preferably, the foil is of the same type as now used for holography. There exist commercial foils for embossing that are used for hologram markings on e.g. credit cards. Before rolling the foil it is preferably cut in a general diagonally curved form (see FIG. 3F), preferably into a stair-like structure (see FIGS. 3B and 3F), in order to obtain the desired three-dimensional structure (when rolled). The foil is subsequently rolled, for example into a cylindrical or similar rotationally symmetric or near-symmetric structure according to FIG. 3C, in order to assume the desired shape of the device (see FIG. 3D). After the rolling is completed the foil is fixed with for example glue. The rolling can be performed manually under a microscope or in dedicated machines. As can be seen from the cross-section view of FIG. 3E, the cross-section number of prisms (i.e. the number of prisms stacked orthogonal to the optical axis) will differ at different positions along the optical axis. Preferably, with the manufacturing procedure of FIGS. 3A-F, the number of prisms in cross section of the device will change successively along the optical axis.

Figure 4:
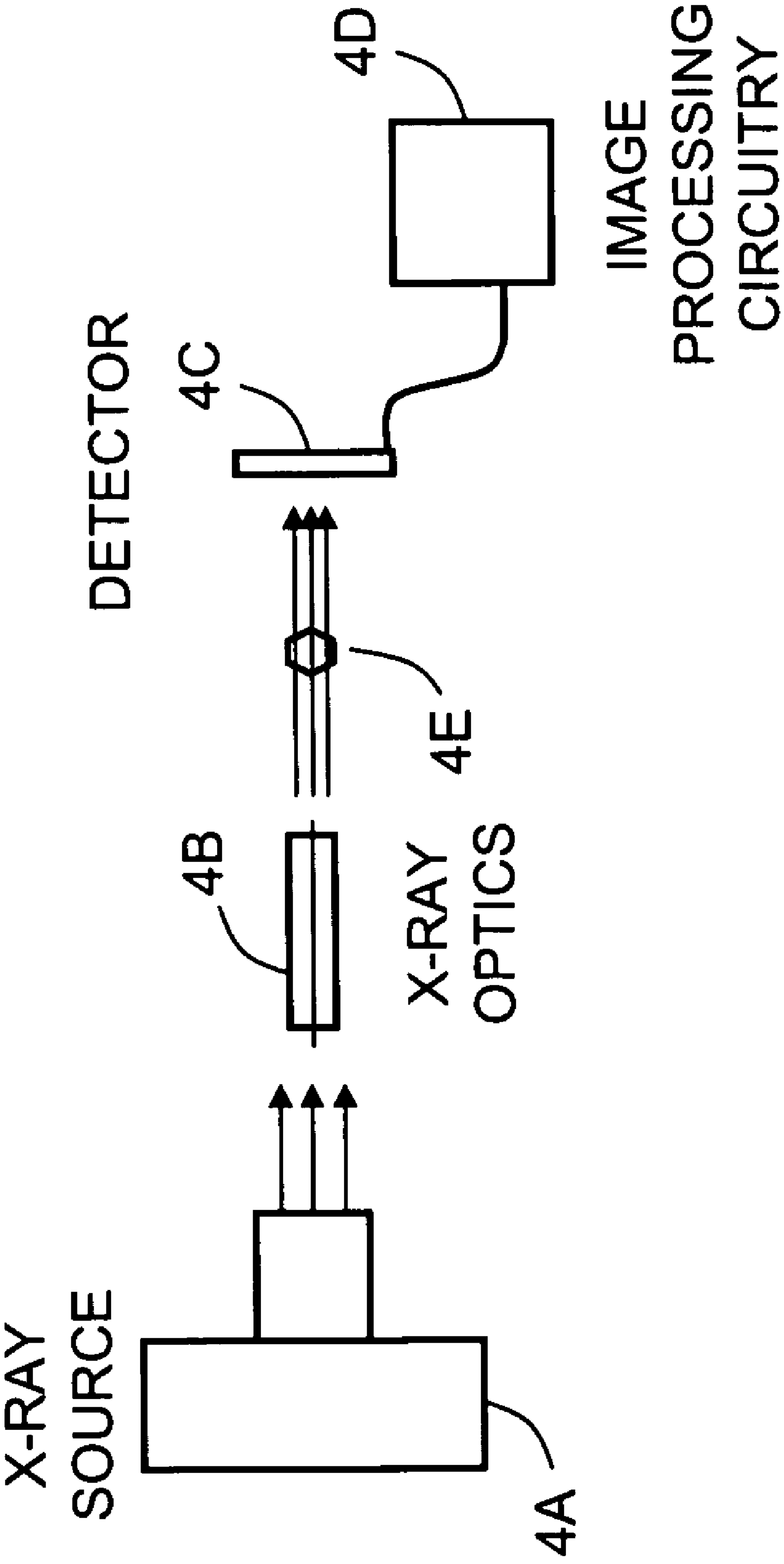
FIG. 4 is a schematic block diagram of an x-ray imaging system according to an exemplary embodiment.

FIG. 4 is a schematic block diagram of an x-ray imaging system using an x-ray optics device. The x-ray imaging system basically comprises an x-ray source (4A), x-ray optics (4B) and a detector (4C) connectable to image processing circuitry (4D). The x-ray optics, and more particularly the optical axis of the three-dimensional prism structure, is preferably aligned with the general direction of incoming x-rays from the x-ray source. In particular the x-ray optics comprises a three dimensional structure of a multitude of prisms for both refraction and diffraction of incoming x-rays in order to focus radiation from the x-ray source. The detector is configured for registering radiation from the x-ray source that has been focused by said x-ray optics and has passed an object (4E) to be imaged. The detector is preferably connectable to image processing circuitry to obtain a useful image. The imaging system may for example be used for medical imaging, e.g. to obtain diagnostic images.

In a preferred exemplary embodiment of the invention, the prisms are arranged in at least one layer along an optical axis for incoming x-rays to achieve the desired focusing effect. Advantageously, the three-dimensional prism structure is arranged such that x-rays further away from the optical axis will traverse more prisms than x-rays close to the optical axis. Example embodiments of a prism structure that can be used have been discussed above.

Figure 5:
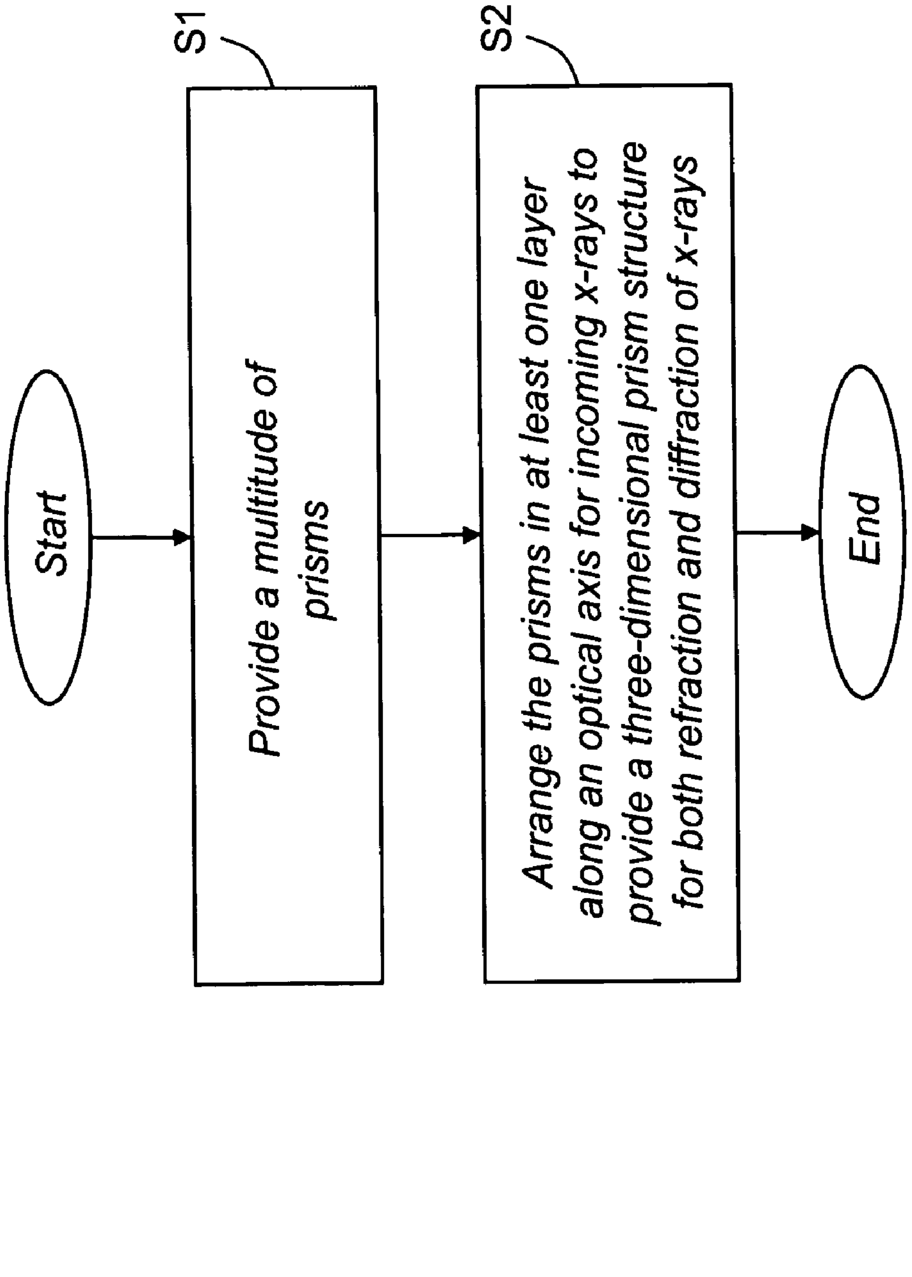
FIG. 5 is a schematic flow diagram of an exemplary manufacturing method.

FIG. 5 is a schematic flow diagram of a method for manufacturing an x-ray optics device. In step S1, a multitude of prisms is provided. In step S2 the prisms are arranged in at least one layer along an optical axis for incoming x-rays to provide a three-dimensional prism structure for both refraction and diffraction of x-rays to shape the x-ray flux. The overall manufacturing procedure covers different methods including that described above in connection with FIGS. 2A-D as well as that described in connection with FIGS. 3A-F. For example, a number of discs, each having at least one layer of prisms, may be assembled side by side in alignment along the optical axis to form the three-dimensional prism structure. Alternatively, it is possible to prepare a foil containing the prisms, and then rolling the foil into the three-dimensional prism structure.

The embodiments described above are merely given as examples, and it should be understood that the claims are not limited thereto. Further modifications, changes and improvements which retain the basic underlying principles disclosed are within the scope of the claims.

The invention claimed is:

1. An x-ray optics device arrangement, wherein said x-ray optics device arrangement is arranged for x-rays of energies exceeding 10 keV, and comprising a plurality of individual three-dimensional prism structures, each having a multitude of prisms for both refraction and diffraction of incoming x-rays to shape the x-ray flux, said multitude of prisms being arranged in at least one layer around an axis of symmetry, corresponding to an optical axis for incoming x-rays, to enable a two-dimensional focusing effect, wherein a number of independent discs, each disc having at least one layer of at least part of a prism, are provided in parallel on a common substrate and a number of such substrates are stacked in alignment to form said plurality of three-dimensional prism structures, such that each three-dimensional prism structure is formed as a rotationally symmetric or near symmetric assembly of a plurality of discs stacked along the optical axis.

2. An x-ray optics device arrangement according to claim 1, wherein each three-dimensional prism structure is arranged such that x-rays further away from the optical axis will traverse more prisms than x-rays close to the optical axis.

3. An x-ray optics device arrangement according to claim 1, wherein the number of prisms orthogonal to the optical axis will be different at different positions along the optical axis.

4. An x-ray optics device arrangement according to claim 1, wherein the discs along the optical axis are grouped, and the number of prisms in a direction orthogonal to the optical axis in a first group of discs generally differs from the number of prisms in a second group of discs.

5. An x-ray optics device arrangement according to claim 4, wherein the distance of a given layer of prisms to the optical axis differs between different discs within a group of discs.

6. An x-ray optics device arrangement according to claim 1, wherein each of a number of discs contains a fraction of a prism.

7. An x-ray optics device arrangement according to claim 1, wherein each of a number of discs contains at least one layer of at least one prism.

8. An x-ray optics device arrangement according to claim 7, wherein each of a number of discs contains two or more layers of at least one prism.

9. An x-ray optics device arrangement according to claim 1, where said discs are fabricated through laser ablation, or through embossing or molding using a master.

10. An x-ray optics device arrangement according to claim 9, where said master is fabricated through etching technique in Silicon.

11. An x-ray optics device arrangement according to claim 9, wherein said master is fabricated through laser ablation.

12. An x-ray optics device arrangement according to claim 1, wherein the flat back of the prisms is oriented to be substantially parallel to the optical axis, an obtuse corner of each prism is pointing in a substantially right angle to the optical axis while sharp angles of each prism are pointing substantially along the optical axis.

13. An x-ray optics device arrangement according to claim 1, wherein mechanical support structures are included to hold the individual prisms.

14. An x-ray optics device arrangement according to claim 13, wherein said prisms and said support structures are made of plastic or any other material which is mainly transparent to x-rays.

15. An x-ray optics device arrangement according to claim 1, wherein said discs have a circular or hexagonal form.

16. An x-ray optics device, wherein said x-ray optics device is adapted for x-rays of energies exceeding 10 keV, and comprising a three dimensional structure of a multitude of prisms for both refraction and diffraction of incoming x-rays to shape the x-ray flux, wherein said multitude of prisms is arranged in at least one layer around an axis of symmetry, corresponding to an optical axis for incoming x-rays, to enable a focusing effect, wherein the x-ray optics device is based on an assembly of a plurality of discs, each disc having at least one layer of at least part of a prism, said discs being stacked along the optical axis to form said three-dimensional prism structure, wherein the discs along the optical axis are grouped, and the number of prisms in a direction orthogonal to the optical axis in a first group of discs generally differs from the number of prisms in a second group of discs.

17. A device according to claim 16, wherein the distance of a given layer of prisms to the optical axis differs between different discs within a group of discs.

18. An x-ray optics device, wherein said x-ray optics device is adapted for x-rays of energies exceeding 10 keV, and comprising a three dimensional structure of a multitude of prisms for both refraction and diffraction of incoming x-rays to shape the x-ray flux, wherein the x-ray optics device is based on a foil having prisms arranged over the foil surface and rolled into said three-dimensional prism structure.

19. A device according to claim 18, where said foil is based on a film of the same type as now used for holography.

20. An x-ray imaging system comprising:

an x-ray source;

x-ray optics arranged for x-rays of energies exceeding 10 keV, said x-ray optics comprising a plurality of individual three dimensional structures, each having a multitude of prisms for both refraction and diffraction of incoming x-rays in order to focus radiation from said x-ray source, said multitude of prisms being arranged in at least one layer around an axis of symmetry, corresponding to an optical axis for incoming x-rays, to enable a two-dimensional focusing effect, wherein a number of independent discs, each disc having at least one layer of at least part of a prism, are provided in parallel on a common substrate and a number of such substrates are stacked in alignment to form said plurality of three-dimensional prism structures, such that each three-dimensional prism structure is formed as a rotationally symmetric or near symmetric assembly of a plurality of discs stacked along the optical axis; and a detector for registering radiation from said x-ray source that has been focused by said x-ray optics and has passed an object to be imaged, said x-ray detector being connectable to image processing circuitry.

21. An x-ray imaging system comprising:

an x-ray source;

x-ray optics arranged for x-rays of energies exceeding 10 keV, said x-ray optics comprising a three dimensional structure of a multitude of prisms for both refraction and diffraction of incoming x-rays in order to focus radiation from said x-ray source, wherein said multitude of prisms is arranged in at least one layer around an axis of symmetry, corresponding to an optical axis for incoming x-rays, to enable a focusing effect, wherein the x-ray optics device is based on an assembly of a plurality of discs, each disc having at least one layer of at least part of a prism, said discs being stacked along the optical axis to form said three-dimensional prism structure, wherein the discs along the optical axis are grouped, and the number of prisms in a direction orthogonal to the optical axis in a first group of discs generally differs from the number of prisms in a second group of discs; and a detector for registering radiation from said x-ray source that has been focused by said x-ray optics and has passed an object to be imaged, said x-ray detector being connectable to image processing circuitry.

22. An x-ray imaging system comprising:

an x-ray source;

x-ray optics arranged for x-rays of energies exceeding 10 keV, said x-ray optics comprising a three dimensional structure of a multitude of prisms for both refraction and diffraction of incoming x-rays in order to focus radiation from said x-ray source, wherein the x- ray optics device is based on a foil having prisms arranged over the foil surface and rolled into said three-dimensional prism structure; and a detector for registering radiation from said x-ray source that has been focused by said x-ray optics and has passed an object to be imaged, said x-ray detector being connectable to image processing circuitry.

23. A method of manufacturing an x-ray optics device arrangement, said method comprising the steps of:

providing a number of independent discs, each disc having at least one layer of at least part of a prism, in parallel on a common substrate;

stacking a number of such substrates in alignment to form a plurality of three-dimensional prism structures such that each three-dimensional prism structure is formed as a rotationally symmetric or near symmetric assembly of a plurality of discs stacked along an axis of symmetry, corresponding to an optical axis for incoming x-rays, each three-dimensional prism structure having a multitude of prisms being arranged in at least one layer around the optical axis for incoming x-rays for both refraction and diffraction of x-rays to shape the x-ray flux.

24. A method of manufacturing an x-ray optics device, said method comprising the steps of:

preparing a foil including a multitude of prisms;

arranging said multitude of prisms in at least one layer around an axis of symmetry, corresponding to an optical axis for incoming x-rays, by rolling said foil into a three-dimensional prism structure for both refraction and diffraction of x-rays to shape the x-ray flux.

25. A method according to claim 24, wherein said foil is cut in a generally diagonally curved form before said step of rolling the foil such that, when the rolled three-dimensional prism structure is used for focusing incoming x-rays, x-rays further away from the optical axis will traverse more prisms than x-rays close to the optical axis.

* * * * *